United States Patent [19]

Schlachter et al.

[11] Patent Number: 4,830,426
[45] Date of Patent: May 16, 1989

[54] LATCHING ARRANGEMENT FOR A TOP AT THE WINDSHIELD FRAME OF A MOTOR VEHICLE

[75] Inventors: Reimund Schlachter, Rutesheim; Bodo Homann, Heimsheim, both of Fed. Rep. of Germany

[73] Assignee: Dr. Ing. h.c.F. Porsche Aktiengesellschaft, Stuttgart, Fed. Rep. of Germany

[21] Appl. No.: 193,672

[22] Filed: May 12, 1988

[30] Foreign Application Priority Data

May 12, 1987 [DE] Fed. Rep. of Germany ....... 3715764

[51] Int. Cl.$^4$ .............................................. B60J 7/185
[52] U.S. Cl. .................................... 296/121; 296/224; 292/239; 292/DIG. 5
[58] Field of Search ...................... 296/120.1, 121.224; 292/239, DIG. 5

[56] References Cited

U.S. PATENT DOCUMENTS

| 399,423 | 3/1889 | Maltbie | 292/239 X |
| 2,385,350 | 9/1945 | Dady | 292/239 |
| 4,664,436 | 5/1987 | Eyb | 296/121 |

Primary Examiner—Dennis H. Pedder
Attorney, Agent, or Firm—Barnes & Thornburg

[57] ABSTRACT

A latching arrangement for a top includes a latching device arranged at a forward frame part of the top and a mounting device provided at the windshield frame, whereby a pivot arm of the latching device movable about an approximately horizontally aligned pivot axis includes a rotatable roller which cooperates during the closing operation of the top with a guide track of the mounting device. In order to achieve with small structural height of the latching arrangement a relatively large lift movement of the top in the vertical direction, two rollers arranged at a distance to one another are provided at the pivot arm which during the actuation of the pivot arm cooperate sequentially with the fixed guide track.

18 Claims, 5 Drawing Sheets

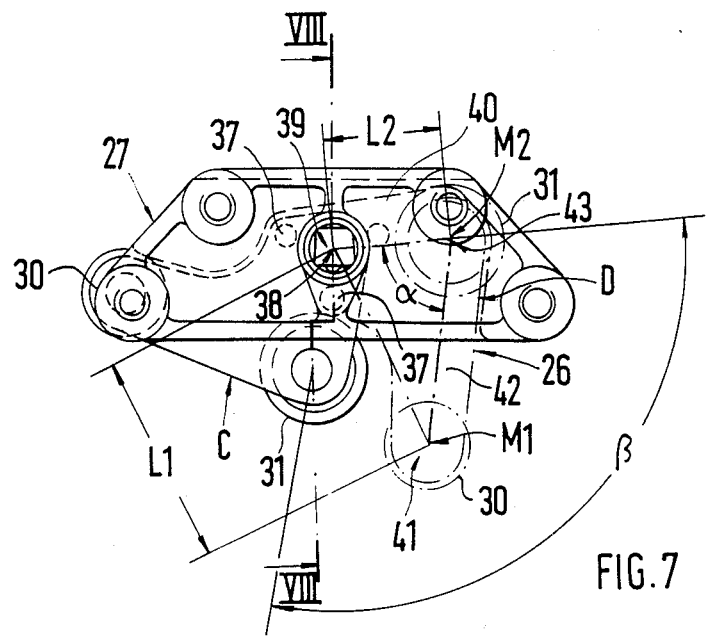
FIG. 7
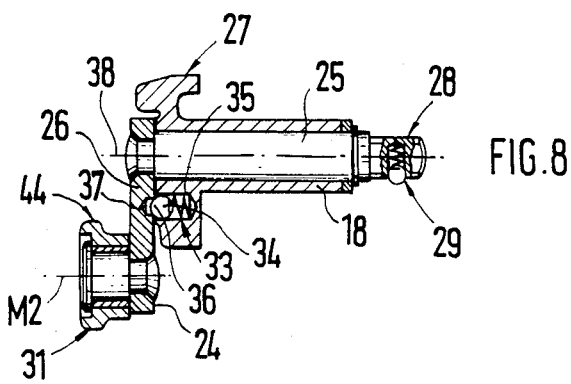
FIG. 8
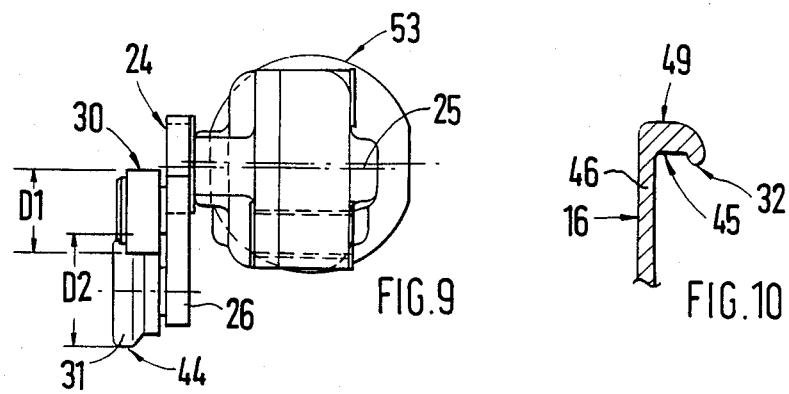
FIG. 9
FIG. 10

LATCHING ARRANGEMENT FOR A TOP AT THE WINDSHIELD FRAME OF A MOTOR VEHICLE

BACKGROUND AND SUMMARY OF THE INVENTION

The present invention relates to a latching arrangement for a top at the windshield frame of a motor vehicle, especially for a foldable top which includes a latching device arranged at the forward frame part of the top and a mounting device provided at the windshield frame, whereby a pivot arm of the latching device movable about an approximately horizontally directed pivot axis includes a roller which cooperates with a guide track of the mounting device during the closing operation of the top.

A latching mechanism for a top which exhibits a good functioning is disclosed in the DE-PS No. 34 13 379 (corresponding to U.S. Pat. No. 4,664,436, issued May 12, 1987), whereby both a manual as also an electric motorized actuation of the pivot arm is provided. However, this arrangement entails the disadvantage that different track guides are required for both versions, as a result of which the manufacturing costs are increased. Furthermore, only slight vertical lift movements can be realized with the manual version by reason of the pivot angle and the configuration of the guide track, i.e., the foldable top must be pulled down relatively far by hand with considerable force application.

It is the object of the present invention to provide a latching arrangement of the aforementioned type between a windshield frame and a forward frame part of the top which with simple construction exhibits a good functioning and by means of which large lift movements in the vertical direction are realizable also with a manually actuated latching device. Furthermore, the operating forces of the actuating mechanism are to be reduced.

The underlying problems are solved according to the present invention in that two rollers arranged at a distance to one another are provided at the pivot arm which, during the actuation of the pivot arm cooperate sequentially with the fixed guide track.

The advantages principally achieved with the present invention reside in that owing to the arrangement of two rollers at the pivot arm, a large lift in the vertical direction can be achieved also with the manual version and, on the other hand, small operating forces are attained during the closing operation. The first roller which carries out the major part of the lift movement has a larger lever arm whereas the second roller effecting the latching has a shorter lever arm. The pivot arm with the two rollers as well as the mounting device with the guide track are constructed identically both with the electric motorized version and the manual version of the latching arrangement, whence the manufacturing costs can be considerably reduced. The distance between the two rollers is so constructed that a type of catchhook effect is achieved, i.e., when the first roller has passed the end cam of the guide track, the second roller already engages in the guide track so that the folding roof can no longer be automatically moved upwardly. With low structural height, a relatively large lift in the vertical direction can be achieved with the latching mechanism in accordance with the present invention.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 7 is a front elevational view of the latching device;

FIG. 8 is a cross-sectional view taken along line VIII—VIII of FIG. 7;

FIG. 9 is side elevational view on the latching device actuated by the electric motor; and FIG. 10 is a cross-sectional view taken along line X—X of FIG. 5.

DETAILED DESCRIPTION OF THE DRAWINGS

Figure 1:
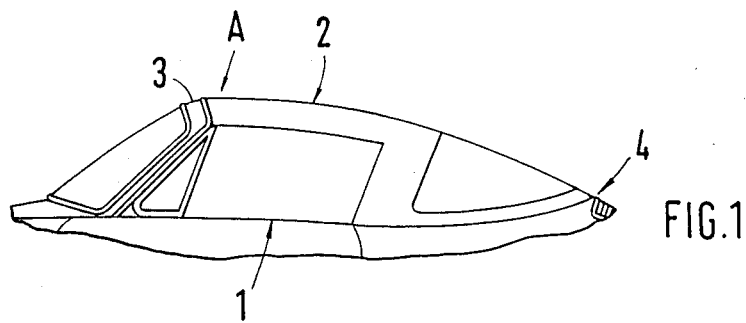
FIG. 1 is a partial side elevational view of a passenger motor vehicle with a foldable roof top.
Figure 5:
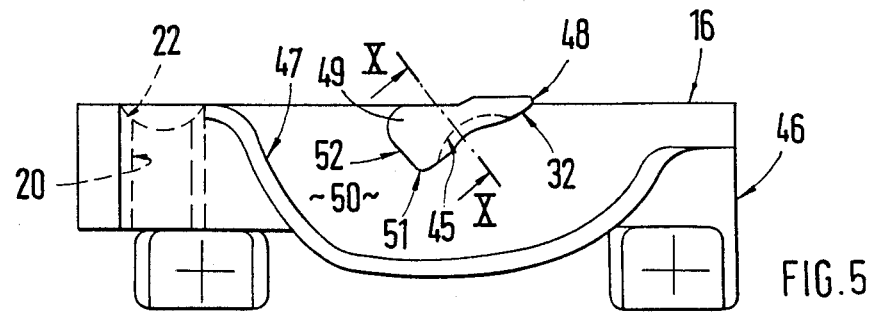
FIG. 5 is a front elevational view of the mounting device in accordance with the present invention.

Referring now to the drawing wherein like reference numerals are used throughout the various views to designate like parts, the partial area of a passenger motor vehicle illustrated in FIG. 1 includes above a belt line 1 a foldable top 2 which in its closed position A extends between a windshield frame 3 and a rear area 4 and is detachably held in its position at the windshield frame 3.

Figure 4:
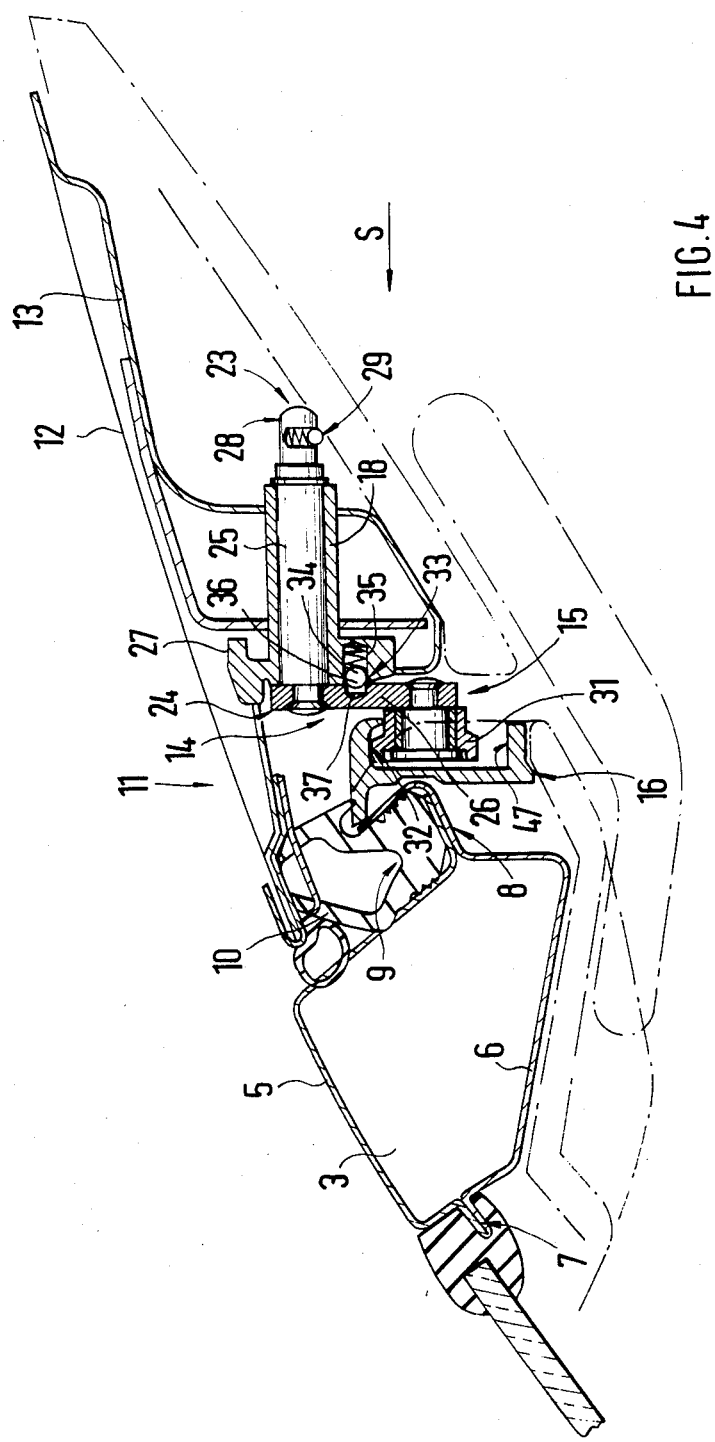
FIG. 4 is a cross-sectional view, taken along line IV—IV of FIG. 3.

The windshield frame 3 is composed of two profiled parts 5 and 6 which are connected with each other by welding at flanges 7 and 8 extending in the same direction (FIG. 4). The outwardly disposed profiled part 5 includes a U-shaped channel 9 into which a sealing body 10 is inserted, on which rests an edge area of a forward frame part 11 of the foldable top 2. The transversely extending forward frame part 11 is composed of sheet metal stampings 12 and 13 which are connected with each other by welding, gluing or the like.

One latching arrangement each generally designated by reference numeral 14 is provided on the two sides of a center longitudinal plane B—B for fixing the foldable top 2 at the windshield frame 3. The left side of the latching arrangement 14, as viewed in the driving direction, is illustrated in FIGS. 2 to 8. Each latching arrangement 14 includes a latching device 15 arranged at the forward frame part 11 of the foldable top 2, a mounting device 16 provided at the windshield frame 3 and a centering device 17 acting between the foldable top 2 and the windshield frame 3 (FIG. 3).

Figure 2:
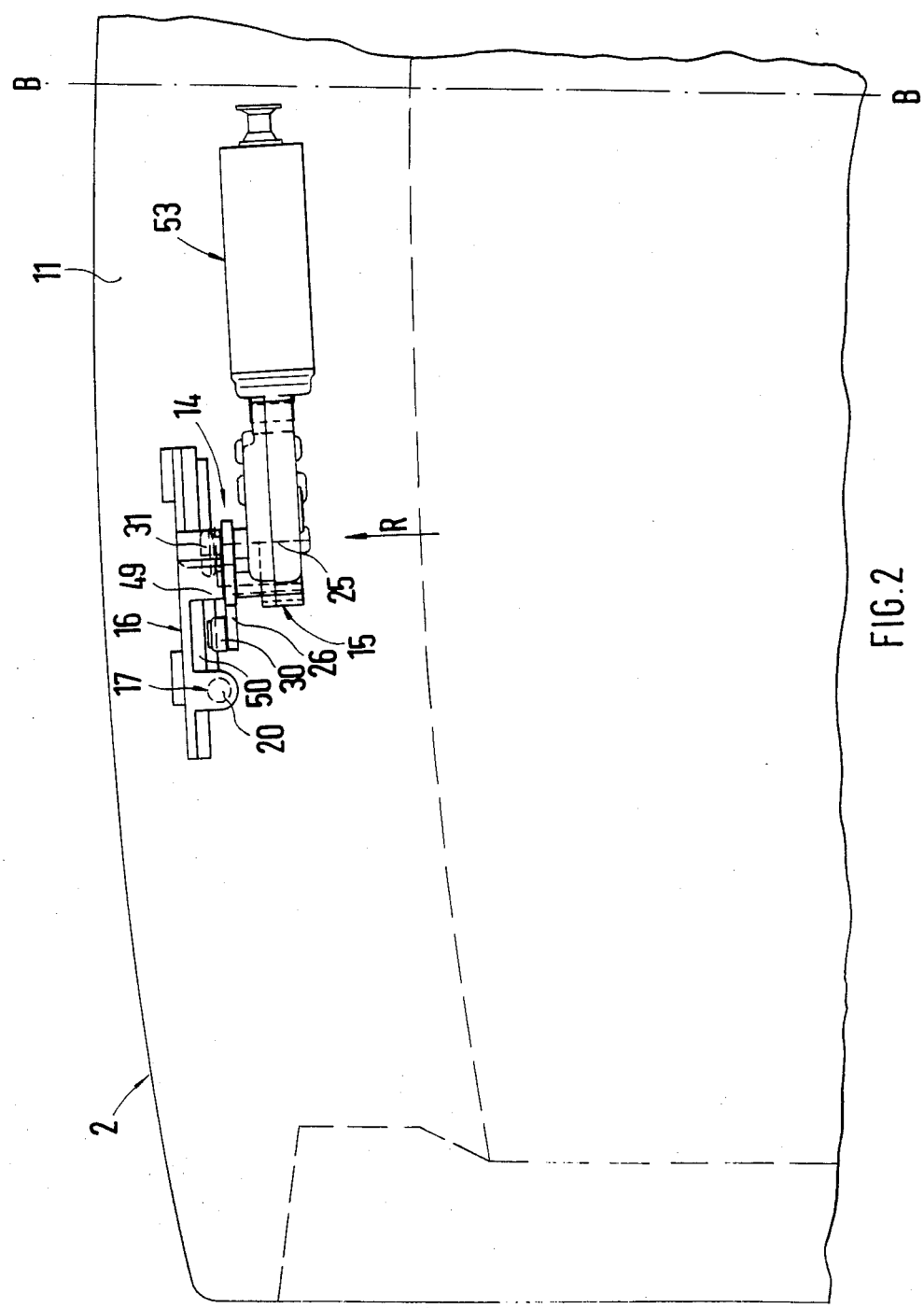
FIG. 2 is a plan view on the forward area of the foldable top, on an enlarged scale, whereby the latching device is coupled with an electric motor.
Figure 3:
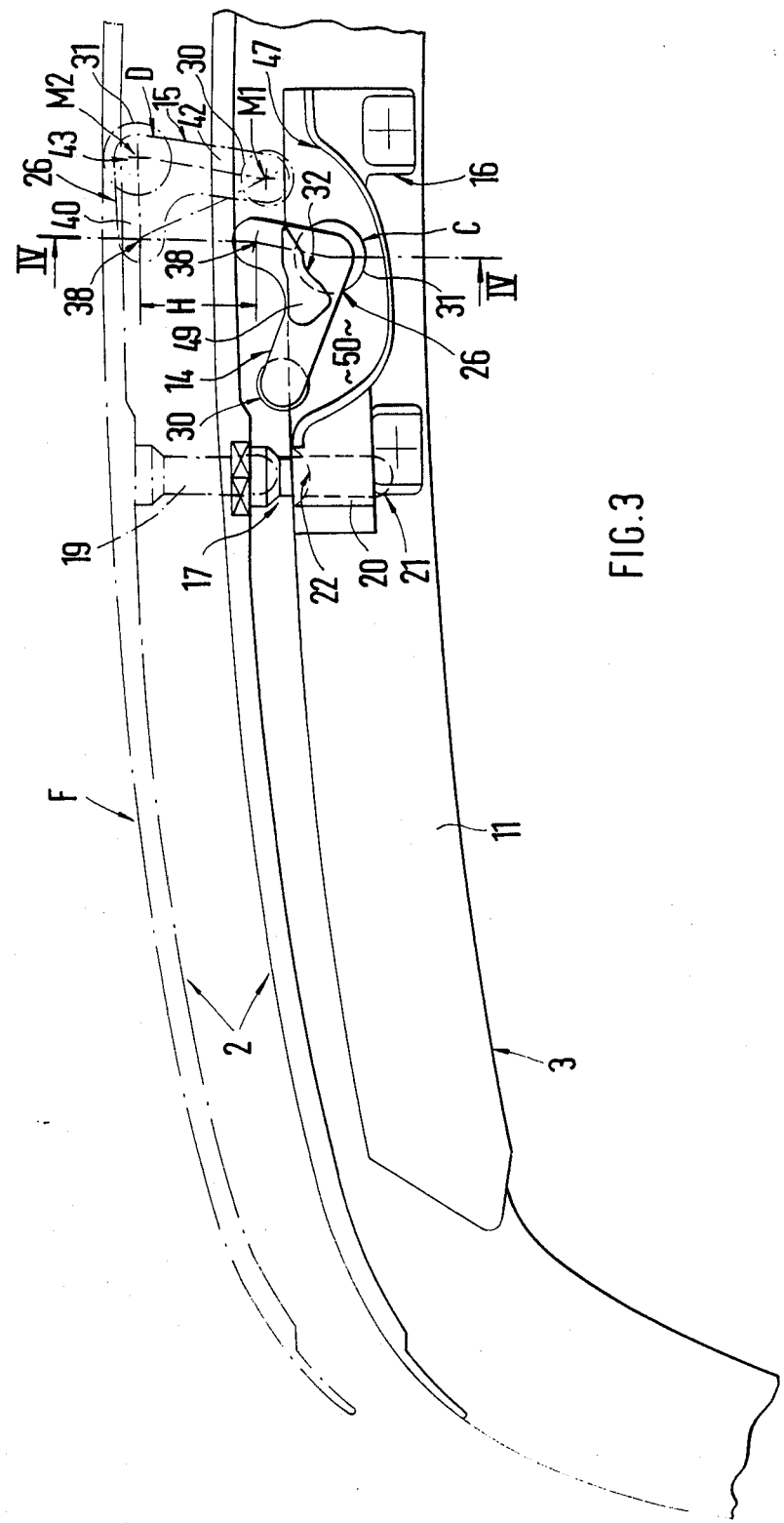
FIG. 3 is an elevational view, taken in the direction of arrow R of FIG. 2.

The centering devices 17 arranged each adjacent the latching arrangements 14 are illustrated in FIGS. 2 and 3 and include each a vertically extending bolt 19 attached at the forward frame part 11 which form-lockingly cooperates with a bushing 20 provided at the mounting device 16. The bushing 20 is arranged in a laterally outwardly disposed end area of the mounting device 16 and is made in one piece therewith. The bolt 19 made of metallic material is constructed spherically shaped at its free end 21. The bushing 20 includes in its upper area a spherically shaped enlargement 22. The foldable top 2 is fixed in its position in the vehicle longitudinal and vehicle transverse direction by means of the centering device 17 before the latching device 15 engages in the mounting device 16.

According to FIGS. 3, 4 and 8, the latching device 15 includes a crank 24 connected with an actuating mechanism 23, whereby the crank 24 is composed of a pivot shaft 25 and of a pivot arm 26. The pivot arm 26 extends at right angle to the pivot shaft 25. The pivot shaft 25 of the crank 24 is aligned approximately horizontally and extends parallel to a center longitudinal plane B—B. Corresponding to FIG. 8, the pivot shaft 25 is received in a cylindrical section 18 of a base plate 27 which is secured at the forward frame part 11 of the foldable top 2 by means of fastening bolts (not shown).

The actuating mechanism 23 for the manually actuatable latching device 15 is formed by a handle (not shown) which is adapted to be detachably mounted over a square-end 28 of the pivot shaft 25. The handle is fixed in its emplaced position by a detachable arresting device 29.

Two rotatably supported rollers 30 and 31 (FIGS. 3, 4, 6, 7 and 8) arranged at a distance to one another are provided at the pivot arm 26 arranged in front of the base plate 27, as viewed in the driving direction, which during the actuation of the pivot arm 26 cooperate sequentially with a guide track 32 of the mounting device 16 in such a manner that during a rotary movement of the pivot arm 26 a vertical lift movement H (FIG. 3) of the frame part 11 of the foldable top 2 as well as a latching of the foldable top 2 is effected.

The two rollers 30 and 31 are so arranged at the pivot arm 26 that the first roller 30 comes out of engagement with the guide track 32 only after the second roller 31 already cooperates with the guide track 32.

An arresting device 33 (FIG. 4) is provided between the pivot arm 26 and the adjoining base plate 27 in the latched position C (FIG. 3) and in the unlatched end position D of the latching arrangement 14. Both the arresting device 33 for the pivot arm 26 as also the arresting device 29 for the handle are each formed by a spring-loaded ball 34 which is inserted into a recess 35, whereby a protruding spherical section 36 engages in an aperture 37 of the pivot arm 26, respectively, of the handle.

The two rollers 30 and 31 additionally have different distances $L_1$ and $L_2$ to the point of rotation 38 of the pivot arm 26. The pivot arm 26 is constructed approximately L-shaped whereby the pivot shaft 25 of the crank 24 is fixedly connected with the free end 39 of the shorter leg 40. The center points $M_1$ and $M_2$ of the two rollers 30 and 31 are arranged at the free end 41 of the longer leg 42 and at the point of intersection 43 of the two legs 40 and 42 in such a manner that the point of rotation 38 of the pivot arm 26 and the two center points $M_1$ and $M_2$ of the two rollers 30 and 31 form a triangle. According to FIG. 7, the angle $\alpha$ of the triangle amounts to about 80°.

Figure 6:
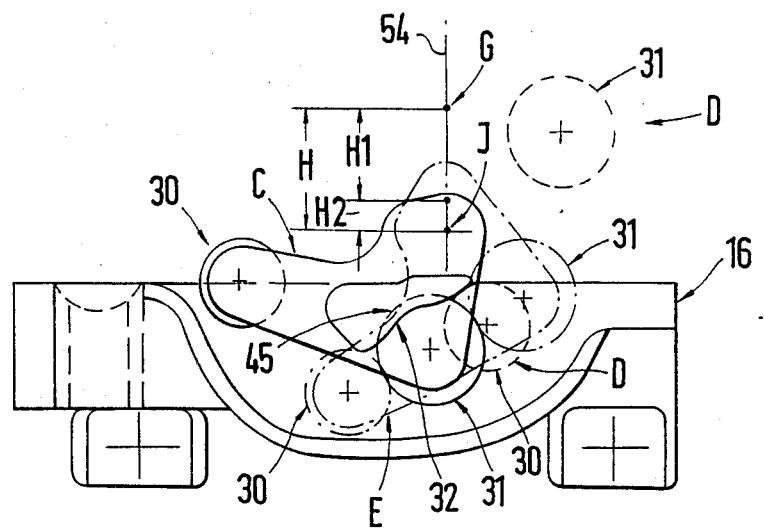
FIG. 6 is a front elevational view of the mounting device and of the latching device.

The first roller 30 arranged at the free end 41 of the longer leg 40 of the pivot arm 26 has thereby a greater distance $L_1$ to the point of rotation 38 of the pivot arm 26 than the second roller 31. It is achieved by this arrangement that a relatively large lift movement H1 in the vertical direction takes place by means of the first roller 30 whereas only a relatively slight lift movement H2 and the latching of the foldable top 2 is achieved by means of the second roller 31 (FIG. 6). The lift H1 is thereby three to five times as large as the lift H2. Additionally, it is achieved by the differing distance L1 and L2 of the two rollers 30 and 31 that during the entire closing operation of the foldable top only a slight actuating force is always necessary.

The first roller 30 includes, as viewed in the vehicle longitudinal direction, a constant outer diamter D1, i.e., no fixing of the foldable top 2 in the vehicle longitudinal direction takes place by means of this roller. The second roller 31 includes on the side facing the mounting device 16 a collar 44 (FIG. 9) which has a larger outside diameter D2 than the adjoining area. With a latched foldable top 2, the second roller 31 engages from behind by means of the collar 44 a circular detent 45 formed at the mounting device 16. The detent 45, as viewed in transverse direction, is arranged offset to the point of rotation 38 of the pivot arm 26 in such a manner that the second roller 31 assumes an over-dead-center position with a latched foldable top C and thus is automatically retained in position. The mounting device 16 secured at the windshield frame 3 includes a plate-shaped base member 46, at which are provided the guide track 32 and a guide section 47. The guide track 32 extending in the vehicle transverse direction has a relatively slight longitudinal dimension in the transverse direction and is arranged at an upper edge area 48 of the base member 46. The guide track 32 is coordinated to an approximately triangularly shaped element 49 which protrudes over the channel-shaped area 50 disposed therebelow in the longitudinal direction (toward the rear). The curve-shaped guide track 32 which drops down obliquely downwardly toward the vehicle outside includes at its lowest end a cam 51 which is adjoined by an obliquely upwardly and outwardly extending section 52. The guide track 32 is composed of a first convex section, a following concave section and a further convex section whereby the latter adjoins the cam 51.

The section 52 and the guide track 32 are arranged approximately at right angle to one another. The guide section 47 is arranged underneath the channel-shaped area 50 and is constructed arcuately shaped. During the lowering of the foldable top 2 by means of the handle, the first roller 30 encounters the guide section 47 and is automatically deflected by the same in the direction of the guide track 32. In case the foldable top 2 is pulled down rapidly, it may happen that also the second roller 31 is deflected by the guide section 47.

In lieu of the manual actuation of the latching device 15, also a motorized actuation is feasible. According to FIG. 2, an electric motor 53 having a transmission is connected to the pivot shaft 25 of the crank 24 whereby the structural unit consisting of electric motor 53 and transmission extends in the vehicle transverse direction. The mounting device 16 arranged at the windshield frame 3 and the pivot arm 26 with the two rollers 30 and 31 are constructed identical for both versions (manual-motorized) so that only the base plate 27 for the manual version, respectively, the housing for the electric motorized version, represent different components for the latching arrangement.

With both actuations (manual-motorized) of the latching device 15, the pivot arm 26 carries out a rotary movement through an angle $\beta$ of about 105°.

The latching arrangement 14 operates as follows: The opened foldable top 2 is pivoted forwardly so far until the bolts 19 engage partly in the bushings 20. In this position F, the foldable top 2 is still about 30 mm. above the windshield frame 3. In the unlatched end position D of the latching device 15, the pivot arm 26 is so aligned that the shorter leg 40 extends approximately in the horizontal direction whereas the longer leg 42 protrudes downwardly approximately vertically. The first roller 30 arranged at the free end 41 of the longer leg 42 then already cooperates with the guide track 32 when the foldable top 25 is still disposed about 25 mm. above the windshield frame 3. By rotation of the actuating mechanism 23 in the clockwise direction, the first roller 30 cooperates with the guide track 32 in such a manner that the foldable top 2 is pulled down automatically in the direction toward the windshield frame 3 by an amount H1. The first roller 30 thereby glides along the guide track 32 up to the cam 51. As soon as the first roller 30 abuts at the cam 51 (intermediate position E), the second roller 31 comes into contact with the guide track (see FIG. 6). By a further rotary movement of the pivot arm 26, the first roller 30 comes out of engagement with the guide track 32 and pivots along the channel-shaped area 50 into the outside (it then no longer exerts any function).

In the latching position C, the second roller 31 engages from below by means of the collar 44 the detent 45 arranged in the center area of the guide track 32.

Both with manual as also with electric motorized actuation, a vertical lift movement H of about 25 mm. can be carried out by means of the latching arrangement in accordance with the present invention during a pivot movement of the actuating mechanism 23 through an angle β of only 105°.

The point of rotation 38 of the pivot arm 26 is disposed above the mounting device 16 both with an unlatched as also with a latched foldable top 2. During the pivoting of the actuating mechanism 23 the point of rotation 38 of the pivot arm 26 travels along a vertical straight line 54 from a point G to a point J disposed therebelow (FIG. 6).

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A latching arrangement for a top at a windshield frame means of a motor vehicle, comprising latching means arranged at a forward frame part of the top, mounting means provided at the windshield frame means, pivot arm means of the latching means movable about an approximately horizontal pivot axis, said pivot arm means including two rotatable roller means which cooperate during the closing operation of the top with a fixed guide track means of the mounting means, the two roller means being arranged on the pivot arm means at a distance to one another and during actuation of the pivot arm means cooperating sequentially with the guide track means.

2. A latching arrangement according to claim 1, wherein the top is a foldable top.

3. A latching arrangement according to claim 1, wherein the two roller means each have an axis with each axis having a different distance to an axis of rotation of the pivot arm means.

4. A latching arrangement according to claim 1, wherein the pivot arm means is constructed approximately L-shaped with two legs, an axis of rotation of the pivot arm means being arranged at an outer end of a shorter leg of the L-shaped means whereas the center points of the two roller means are provided, on the one hand, in the point of intersection of the two legs and, on the other, at an outer end of the other leg.

5. A latching arrangement according to claim 4, wherein the axis of rotation of the pivot arm means and the axes of the two roller means are arranged substantially triangularly shaped to one another.

6. A latching arrangement according to claim 3, wherein during the cooperation of the first roller at said outer end of the other leg and said guide track means, the top carries out a vertical lift movement by a first amount whereas during the following cooperation of the second roller means, at said point of intersection of the two legs, with the guide track means, the top carries out a vertical movement by a second amount and additionally a latching of the top takes place.

7. A latching arrangement according to claim 1, wherein the first roller means comes out of engagement with the guide track means after the second roller means is in contact with the guide track means.

8. A latching arrangement according to claim 1, wherein the two roller means have different outside diameters.

9. A latching arrangement according to claim 1, wherein the guide track means provided at the mounting means is curved and inclined obliquely downwardly in the direction toward the vehicle outside and includes a circularly shaped detent in a center area which defines the latching position of the top.

10. A latching arrangement according to claim 9, wherein a cam is provided at the lower end of the guide track means which is adjoined by a section extending obliquely upwardly at approximately right angle to the guide track means that enables free pivoting of a first of said two roller means after passing the cam.

11. A latching arrangement according to claim 10, wherein a channel-shaped area is provided underneath the guide track means at the mounting means which is delimited in the downward direction by an arcuately shaped guide section, whereby said guide section deflects the first roller means in the direction toward the guide track means.

12. A latching arrangement according to claim 6, wherein the pivot arm means is constructed approximately L-shaped with two legs, the axis of rotation of the pivot arm means being arranged at an outer end of a shorter leg of the L-shaped means whereas the axes of the two roller means are provided, on the one hand, in the point of intersection of the two legs and, on the other, at an outer end of the other leg.

13. A latching arrangement according to claim 12, wherein the axis of rotation of the pivot arm means and the axes of the two roller means are arranged substantially triangularly shaped to one another.

14. A latching arrangement according to claim 6, wherein the first roller means comes out of engagement with the guide track means after the second roller means is in contact with the guide track means.

15. A latching arrangement according to claim 14, wherein the two roller means have different outside diameters.

16. A latching arrangement according to claim 6, wherein the guide track means provided at the mounting means is curved and inclined obliquely downwardly in the direction toward the vehicle outside and includes a circularly shaped detent in a center area which defines the latching position of the top.

17. A latching arrangement according to claim 16, wherein a cam is provided at the lower end of the guide track means which is adjoined by a section extending obliquely upwardly at approximately right angle to the guide track means that enables free pivoting of a first of said two roller means after passing the cam.

18. A latching arrangement according to claim 17, wherein a channel-shaped area is provided underneath the guide track means at the mounting means which is delimited in the downward direction by an arcuately shaped guide section, whereby said guide section deflects the first roller means in the direction toward the guide track means.

* * * * *